(12) United States Patent
Nogami

(10) Patent No.: US 6,394,827 B2
(45) Date of Patent: May 28, 2002

(54) CARD CONNECTOR

(75) Inventor: Daisuke Nogami, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/854,752

(22) Filed: May 15, 2001

(30) Foreign Application Priority Data

Jun. 8, 2000 (JP) ........................................ 2000-172254

(51) Int. Cl.[7] .............................................. H01R 13/62
(52) U.S. Cl. ....................................................... 439/159
(58) Field of Search ................................ 439/630, 159, 439/160, 155, 152

(56) References Cited

U.S. PATENT DOCUMENTS 4,874,323 A * 10/1989 Shibano ..................... 439/260
4,952,161 A * 8/1990 Komatsu ..................... 439/155
5,674,080 A * 10/1997 Takemura ................... 439/159
6,162,075 A * 12/2000 Hara et al. ................... 439/159

FOREIGN PATENT DOCUMENTS

JP 59-149576 8/1984
JP 11-135192 5/1999

* cited by examiner

Primary Examiner—Gary F. Paumen
Assistant Examiner—Ann McCamey
(74) Attorney, Agent, or Firm—Kanesaka & Takeuchi

(57) ABSTRACT

A card connector comprises a case (2) for accommodating a removable card (1), a slider (3) provided within the case (2) for sliding along with the card (1) in the insertion/removal direction, a spring (32) for biasing the slider (3) in the card removing direction, a lock arm (67) provided on the case (2) for engaging the slider (3) when the card (1) is inserted into the case (2), and a lock release lever (70) operable in the direction perpendicular to the major face of the case (2) for release the slider (3) from the case (2).

6 Claims, 22 Drawing Sheets

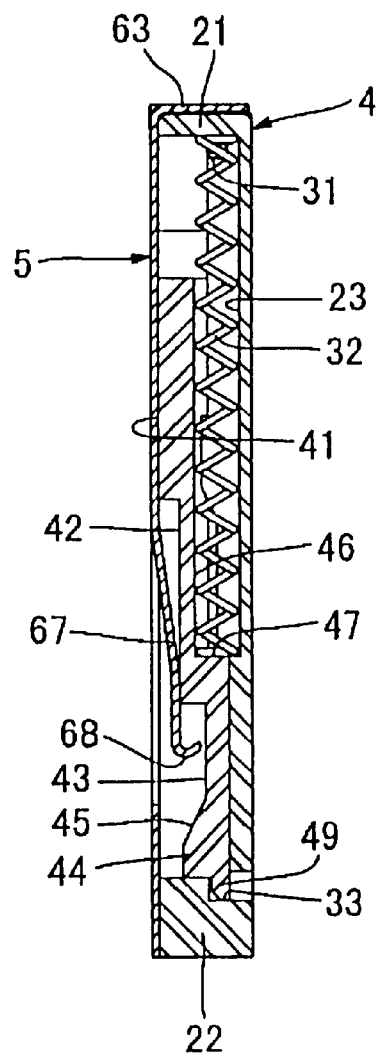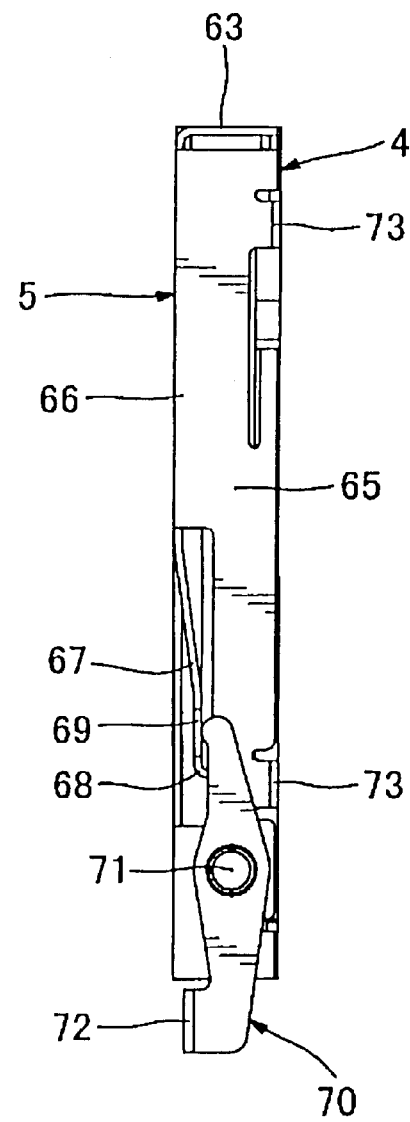
FIG. 3
FIG. 4

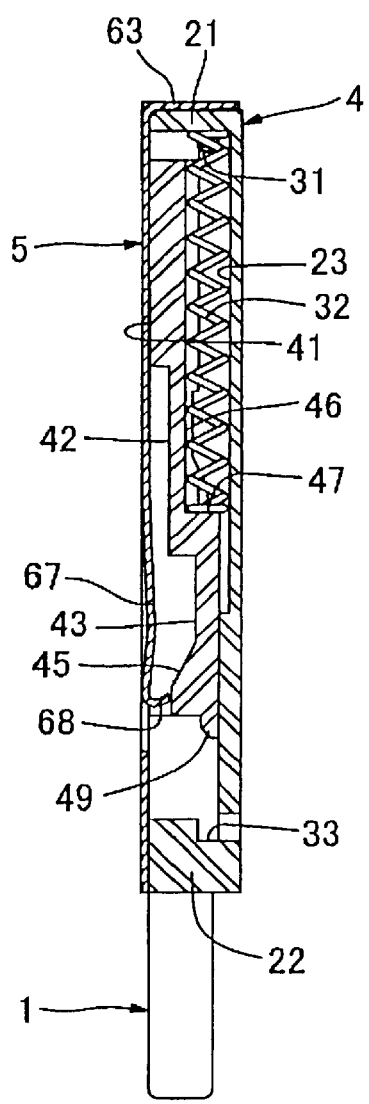
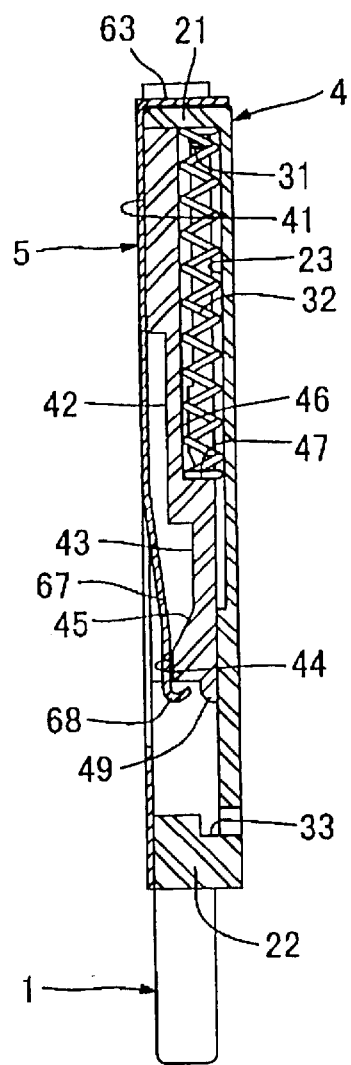
FIG. 10
FIG. 12

CARD CONNECTOR

BACKGROUND OF THE INVENTION

1. Field of the Invention

The present invention relates to card connectors for connecting a removable card to a circuit board and, more particularly, to a card connector for holding a removable card for a mobile device.

2. Description of the Related Art

Such a card connector is disclosed in, for example, Japanese patent application Kokai Nos. 59-149576 (JP'576) and 11-135192 (JP'192).

The connector of JP'576 comprises a sliding ejector member that abuts on an inserted card, a spring for biasing the ejector member in a card removing direction, a rotation support for locking the ejector member at a card insertion position, and an ejector lever for releasing the lock of the ejector member. To mount a card, the card is pushed into the insertion opening to lock the ejector member with the rotation support. To remove the card, the ejector lever is depressed to move the rotation support for release of the lock of the ejector member so that the spring pushes out the card.

The connector of JP'192 comprises a body, a slider that is pushed into the body along with a card, a spring member provided between the body and the slider, and a cam mechanism consisting of a cam member and a pin member. The cam mechanism locks and unlocks the slider. Both of insertion and removal of a card is made by pushing the card or "push-push operation".

In the above connectors, however, the card insertion/removal mechanism, especially, the ejector member and/or the slider lock/unlock mechanism, is too complicated and too large in the number of components to provide a compact and inexpensive connector. In addition, the insertion/removal of a card is difficult because the card insertion/removal face of a mobile device is small.

In the push-push type connector of JP'192, the end of a card projects from the mobile device so that not only the card can be damaged or fall when the mobile device is dropped but also the design choices are limited. Moreover, a space necessary for the push-push operation requires a wide body of the device. The length of sliding contact between the card contact point and the connector contact point becomes so large that the life of the contacts is shortened.

SUMMARY OF THE INVENTION

Accordingly, it is an object of the invention to provide a card connector capable of reducing the number of components, simplifying the mechanism, reducing the manufacturing cost, and making the device compact.

According to the invention there is provided a card connector for electrically connecting a removable card to a circuit board, comprising a case for supporting the removable card; a slider provided within the case for sliding along with the removable card in a card insertion/removal direction; a spring member for biasing the slider in a card removing direction; a lock member for locking the slider to the case when the removable card is inserted into the case; a release member operable from a major face of the case for releasing the slider from the case.

It is preferred that the case comprises a case body of an insulative material; a plurality of terminals provided on the case body; a metal cover provided over the case body; and at least one fixing means for fixing the case to the circuit board. Also, the lock means may comprise a stopper arm cantilevered to a major face of the metal cover so as to be flexible for engagement with the slider. The release means comprises a release lever rotatable about a fulcrum to lift the stopper arm for releasing the slider from the case. Furthermore, the card connector may comprise a regulation means for regulating rotation of the release lever to thereby regulate movement of the stopper arm.

According to another aspect of the invention there is provided a card connector for electrically connecting a removable card to a circuit board, comprising a case for accommodating the removable card; a slider provided within the case for sliding in a card insertion/removal direction; a spring member for biasing the slider in a card removing direction; a card retention arm cantilevered on the slider in the card insertion/removal direction and having an inward projection; a raised portion provided on the case so as to abut on an outer face of the card retention arm so that when a removable card with a notch provided on a side thereof is inserted into the case, the inward projection engages the notch and when the removable card is further inserted, the inward projection restricts outward movement of the card retention arm.

It is preferred that the card retention arm comprises a downward projection and the raised portion has an inclined face with a rising gradient in a card insertion direction so that when a removable card with no notch provided on a side thereof is inserted into the case, the downward projection slides on the inclined face to lift the card retention arm while the card retention arm is flexed outwardly. Also, the card retention arm may have an engaging portion so that when a removable card with no notch on a side thereof is inserted into the case, the card retention arm is flexed outwardly and the engaging portion engages the raised portion. Furthermore, the slider comprises a card abutment for abutment with a front end of the removable card and a guide section for sliding on the case in the card insertion/removal direction. Moreover, the card abutment may comprise at least one support wall, the case has at least one raised portion for guiding the support wall so that if the removable card is inserted in a wrong direction, the raised portion blocks the slider, thereby preventing completion of such insertion.

According to still another aspect of the invention there is provided a card connector for electrically connecting a removable card to a circuit board, comprising a case for accommodating the removable card; a slider provided within the case for sliding along with the removable card in a card insertion/removal direction; a spring member for biasing the slider in a removing direction; a card retention arm cantilevered to the slider in the card insertion/removal direction and having an inward projection and a downward projection at a front end thereof; an elongated groove provided in the case in the card insertion/removal direction so that when a removable card with a notch provided on a side thereof is inserted into the case, the inward projection engages the notch and the downward projection slides on the case and then engages the elongated groove to prevent the card retention arm from reflecting outwardly whereas when a removable card with no notch is inserted into the case, the card retention arm is flexed outwardly and the downward projection slides on the case outside the elongated groove.

When the removable card is inserted into the case, the lock member engages the slider to lock the removable card in the case. The operation of the lock release member releases the slider from the lock member for removal of the removable card.

BRIEF DESCRIPTION OF THE DRAWINGS

FIG. 3 is a sectional view taken along line A—A of FIG. 2;

FIG. 4 is a side elevational view of the card connector;

FIG. 10 is a sectional view taken along line A—A of FIG. 9;

FIG. 12 is a sectional view taken along line A—A of FIG. 11;

DESCRIPTION OF THE PREFERRED EMBODIMENT

Figure 1:
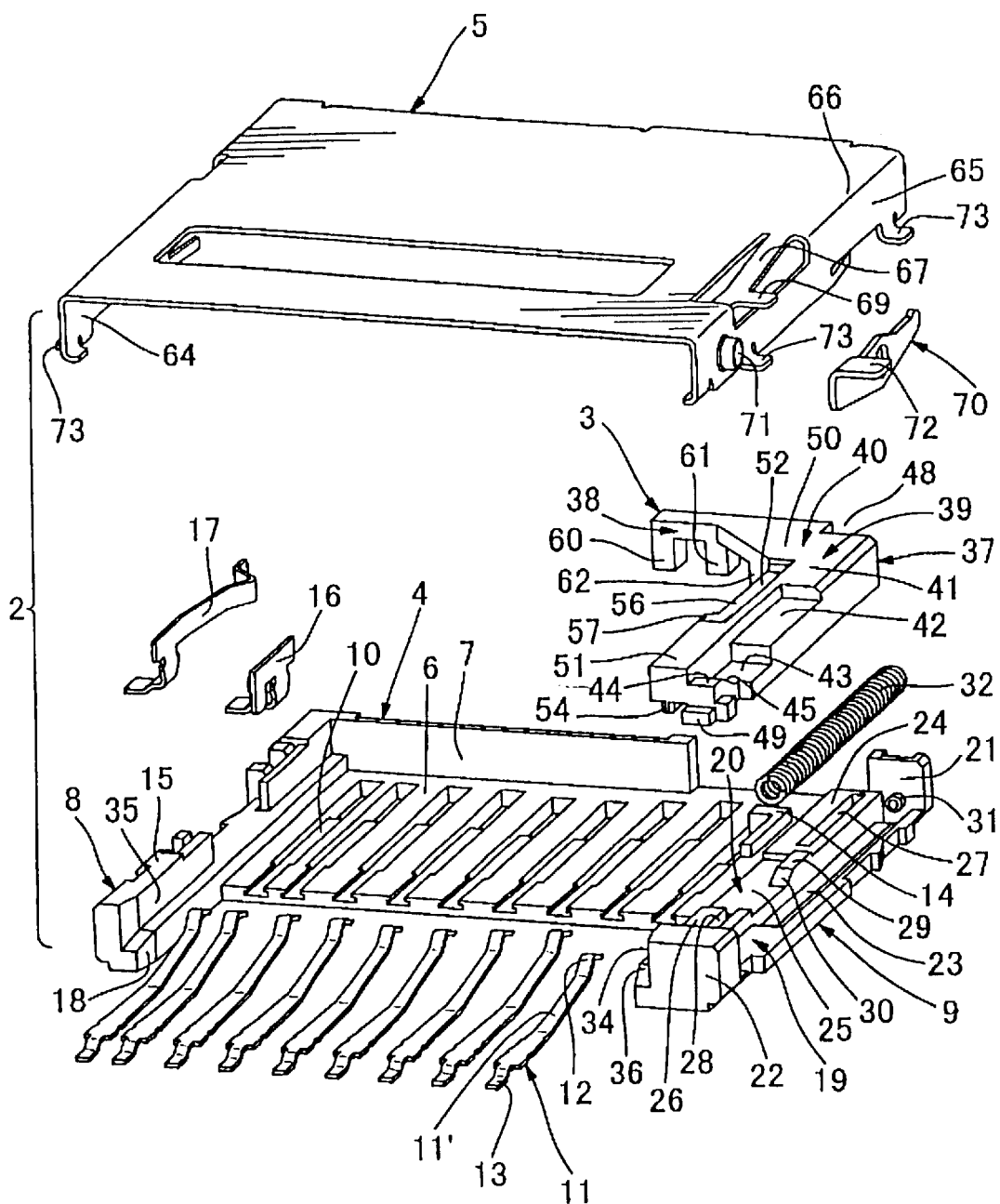
FIG. 1 is an exploded perspective view of a card connector according to an embodiment of the invention.

Embodiments of the invention will now be described with reference to the accompanying drawings.

In FIGS. 1–4, a card connector comprises a case 2 for holding a removable card 1 (hereinafter simply "card") and a slider 3 provided in the case 2 for sliding. The case 2 consists of a case body 4 made of an insulative material, such as a synthetic resin, and a case cover 5 made of a metal so as to cover the case body 4. The case body 4 has a terminal receiving bottom plate 6, a card abutment rear wall 7 erected at the rear end of the bottom plate 6, and a pair of side arms 8 and 9 provided on opposite sides of the bottom plate 6. Nine terminal channels 10 are provided in the bottom plate 6 to receive elongated terminals 11. Each terminal 11 has a cantilevered section 11' that is flexible in the up-and-down direction and has a contact point 12 at a free end. Also, it has a depending connection section 13 to be connected to a circuit board (not shown). A raised L-shaped portion 14 is provided on the bottom plate 6 at the rear corner of the terminal channel 10 that is located on the uttermost right-hand side.

A guide wall 15 is provided on the outer face of the left-hand side arm 8 to support a pair of male and female terminals 16 and 17. A jaw section 18 is provided at a front lower corner of the left-hand side arm 8. The front inner faces of the jaw section 18 and the guide wall 15 are tapered, respectively. The right-hand side arm 9 consists of an outer section 19, an inner section 20 that is higher than the outer section 19, a rear abutment 21 provided at the rear end of the side arm 9, and a front abutment 22 provided at the front end of the side arm 9. A spring mount groove 23 extends forwardly from the rear end of the outer section 19. A first key groove forming portion 24, a step-down portion 25, and a second key groove forming portion 26 are arranged in this order from the rear end of the inner section 20. First and second key grooves 27 and 28 are provided in the first and second key groove forming portions 24 and 26, respectively. The step-down portion 25 is lower than the first and second key groove forming portions 24 and 26, and a raised portion 29 extend forwardly from the first key groove forming portion 24. The raised portion 29 is slightly higher than the first and second key groove forming portions 24 and 26 and has an inclined face 30 with a rising gradient in the insertion direction of the card 1. A boss 31 extends forwardly from the rear abutment 21 to support an end of a spring 32 that is placed in the spring mount groove 23. An engaging groove 33 is provided in the rear face of the front abutment 22. The distance between the inner faces 34 and 35 of the front abutment 22 and the guide wall 15 is substantially equal to the width of the card 1. A jaw portion 36 is provided on the lower inner face of the front abutment 22, and the front upper face of the jaw portion 36 and the front inner face of the of the front abutment 22 are tapered.

The slider 3 is made of an insulative material, such as a synthetic resin, so as to provide a guide section 37 extending in the insertion/removal direction of the card 1 and a card abutment 38 extending at right angles with the guide section 37. The guide section 37 is made up of an outer portion 39 corresponding to the outer section 19 of the right-hand side arm 9 and an inner portion 40 corresponding to the inner section 20 of the right-hand side arm 9. A highest face 41, an intermediate face 42, and a lowest face 43 are arranged in this order from the rear end of the outer portion 39. A raised portion 44 as high as the intermediate face 42 is provided on the front portion of the lowest face 43. The raised portion 44 has an inclined face 45 having a rising gradient in the removing direction of the card 1. A spring cover groove 46 is provided at the position corresponding to the spring mount groove 23 of the right-hand arm section 9. A spring abutment 47 is provided at the front end of the spring cover groove 46. A shoulder portion 48 is provided at the rear end of the outer portion 39 to engage the rear abutment 21. An engaging projection 49 extends forwardly from the front end of the outer section 39 to fit into the engaging groove 33 of the front abutment 22. Consequently, the slider 3 does not fall from the case body 4 during assembling, thus improving the assembling efficiency.

The first and second key forming portions 50 and 51 are provided on the rear and front sides of the inner section 40 to form an intermediate space 52 between them. The first key (not shown) and the second key 54 are provided on the lower faces of the key forming sections 50 and 51 for sliding in the first and second key grooves 27 and 28, respectively. When the first and second keys engage the first and second key grooves 27 and 28, the inner face 55 of the second key forming portion 51 becomes flush with the inner face 34 of the front abutment 22.

A card retaining arm 56 extends forwardly from the first key forming portion 50 into the intermediate space 52. When the first and second keys engage the first and second key grooves 27 and 28, the outer face of the card retaining arm 56 makes contact with the inner face of the raised portion 29. An inward projection 57 and a downward projection 58 are provided on the front end of the card retaining arm 56. They have a curved inner face and a tapered outer face. The inward projection 57 projects inwardly more than the inner face 55. A gap 59 is provided under the card retaining arm 56 between the downward projection 58 and the first key forming section 50.

Three support walls 60, 61, and 62 are provided on the lower face of the card abutment 39 and the triangular linking section of the guide section 37 for sliding in the insertion/removal direction of the card 1 between the respective terminals 11. The case cover 5 is made by bending downwardly the rear and side portions 63, 64, and 65, respectively, to cover the rear wall 7, the left-hand side arm 8, the slider 3, and the rear and front abutments 21 and 22. A stopper arm 67 extends forwardly from a portion of the right-hand bending edge 66 and has a downward hook 68 and an engaging piece 69 that extends outwardly beyond the right-hand side face 65. A lock release lever 70 made of a metal sheet is attached to the front portion of the right-side face 65 for rotation about a support stud 71. The front portion of the lock release lever 70 projects forwardly from the front end of the case cover 5 and has an operation tab 72. The rear end of the lock release lever 70 is rounded for engagement with the engaging piece 69. Two pairs of fixing legs 73 extend outwardly from the lower edges of the left- and right-hand side walls 64 and 65 and are soldered to a circuit board (not shown). The fixing leg 73 toward the front end of the right-hand side wall 65 is located under the rear portion of the lock release lever 70 for restricting the downward movement of the rear portion. Where a fixing leg or legs 73 are soldered to the ground circuit of the circuit board, the case cover 5 serves as a ground member, too.

Figure 19:
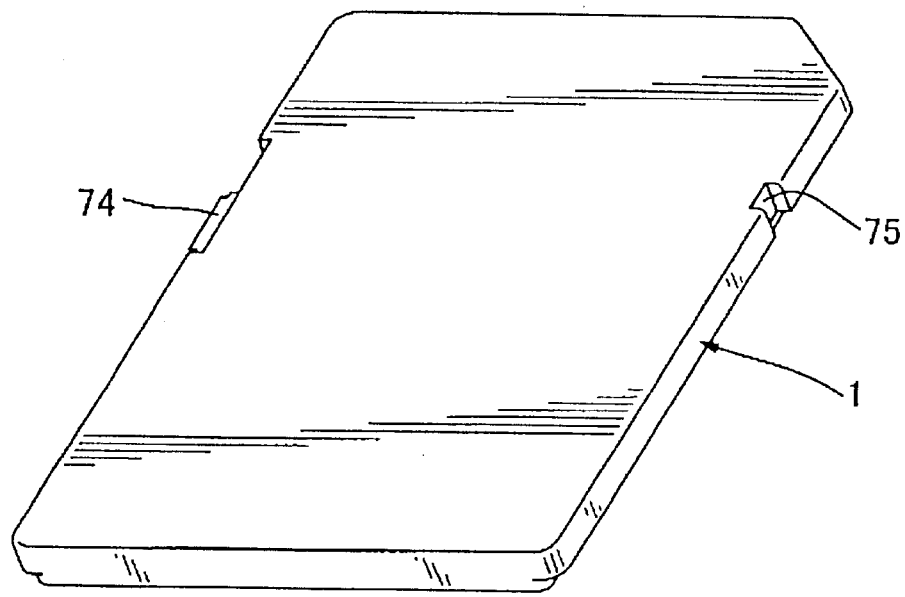
FIGS. 19 and 20 are perspective views a card for the card connector.
Figure 20:
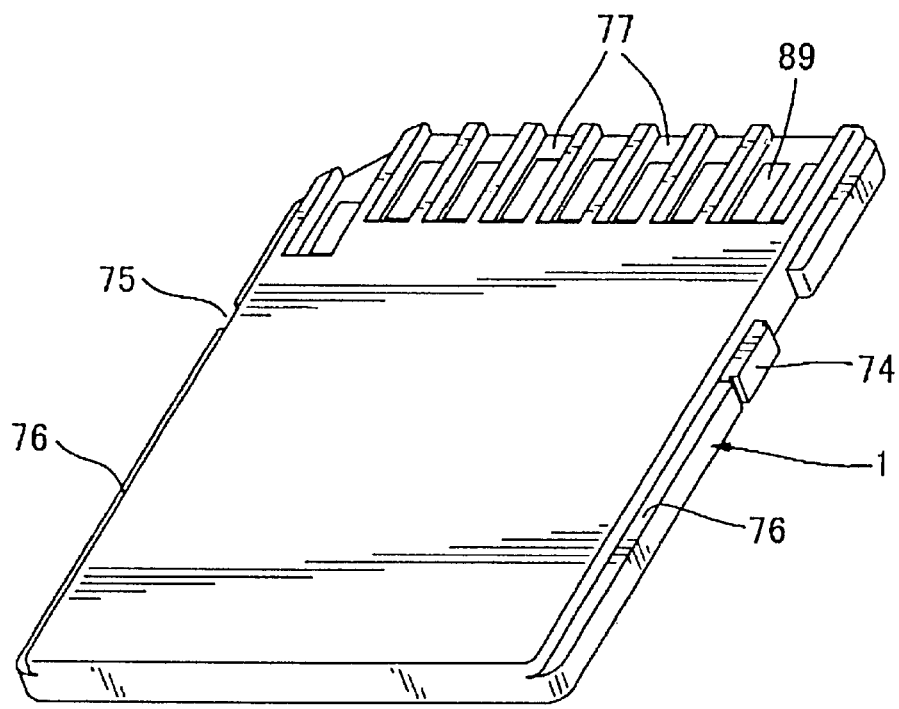
Figure 21:
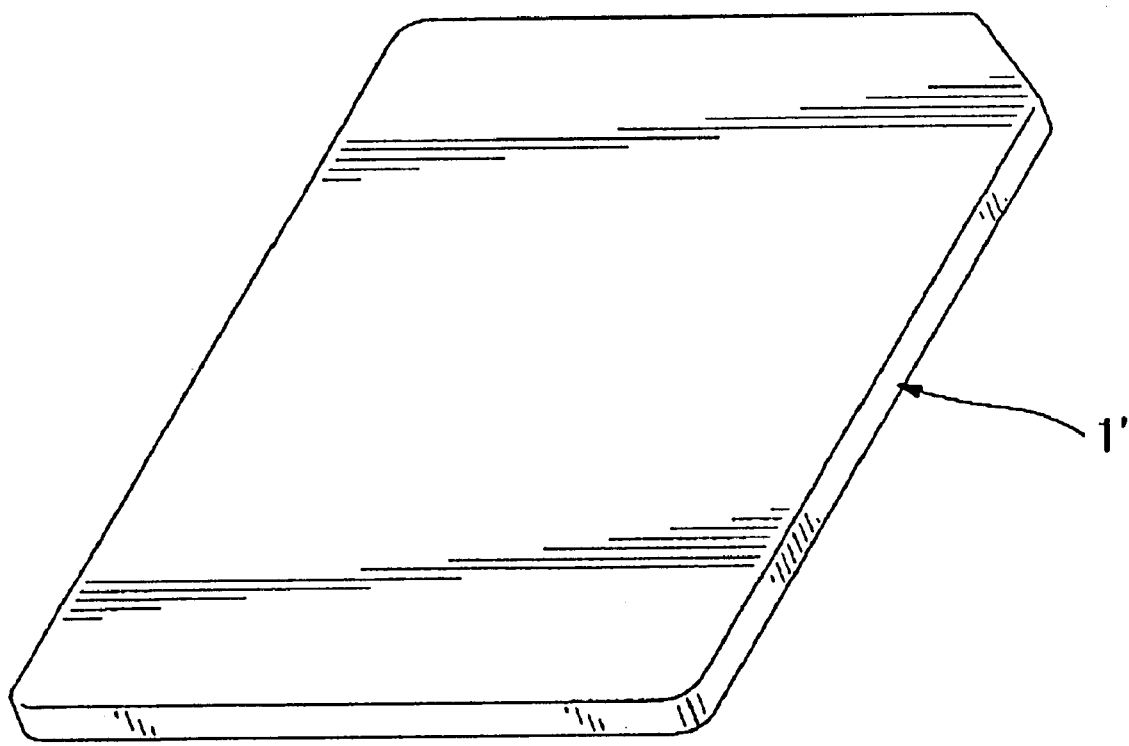
FIG. 21 is a perspective view of another card for the card connector.

An example of the card for the invention will be described with reference to FIGS. 19 and 20. The card 1 is a so-called memory card and is cut out at the front right-hand corner. It has a write protective switch 74 on the left-hand side and a retention notch 75 on the right-hand side. Also, it has a pair of elongated shoulders 76 extending along the back-side side edges and a plurality of terminal channels 77 in the front portion for supporting terminals 89. Alternatively, as shown in FIG. 21, another card 1' that has neither write protective switch nor retention notch may be used.

The insertion/removal operation of the card connector will be described with reference to FIGS. 2–16.

Figure 2:
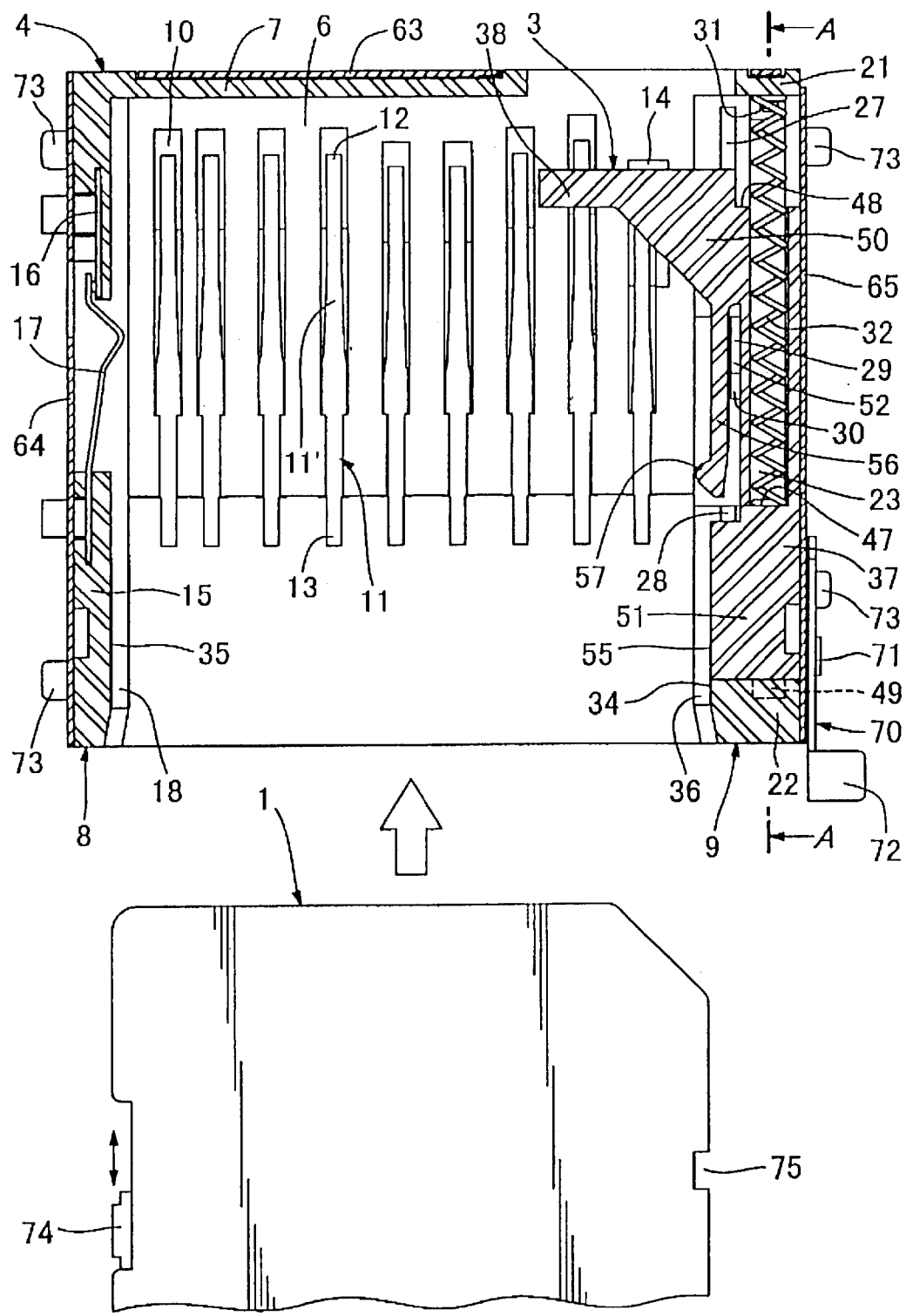
FIG. 2 is a plan sectional view of the card connector.

In FIGS. 2–4, when the card 1 is not inserted into the case 2, the slider 3 is pushed to the front position by the spring 32 and the engaging projection 49 is fitted in the engaging hole 33 so that the slider 3 is kept without rattling. The card 1 is inserted into the case 2, with the retention notch 75 being on the right-hand side. Since the front ends of the guide wall 15, the front abutment 22, and the jaws 18 and 36 are tapered, it is easy to insert the card 1 to the case 2. The jaws 18 and 36 of the arm sections 8 and 9 prevent the card 1 from being inserted into the case 2 upside down.

Figure 5:
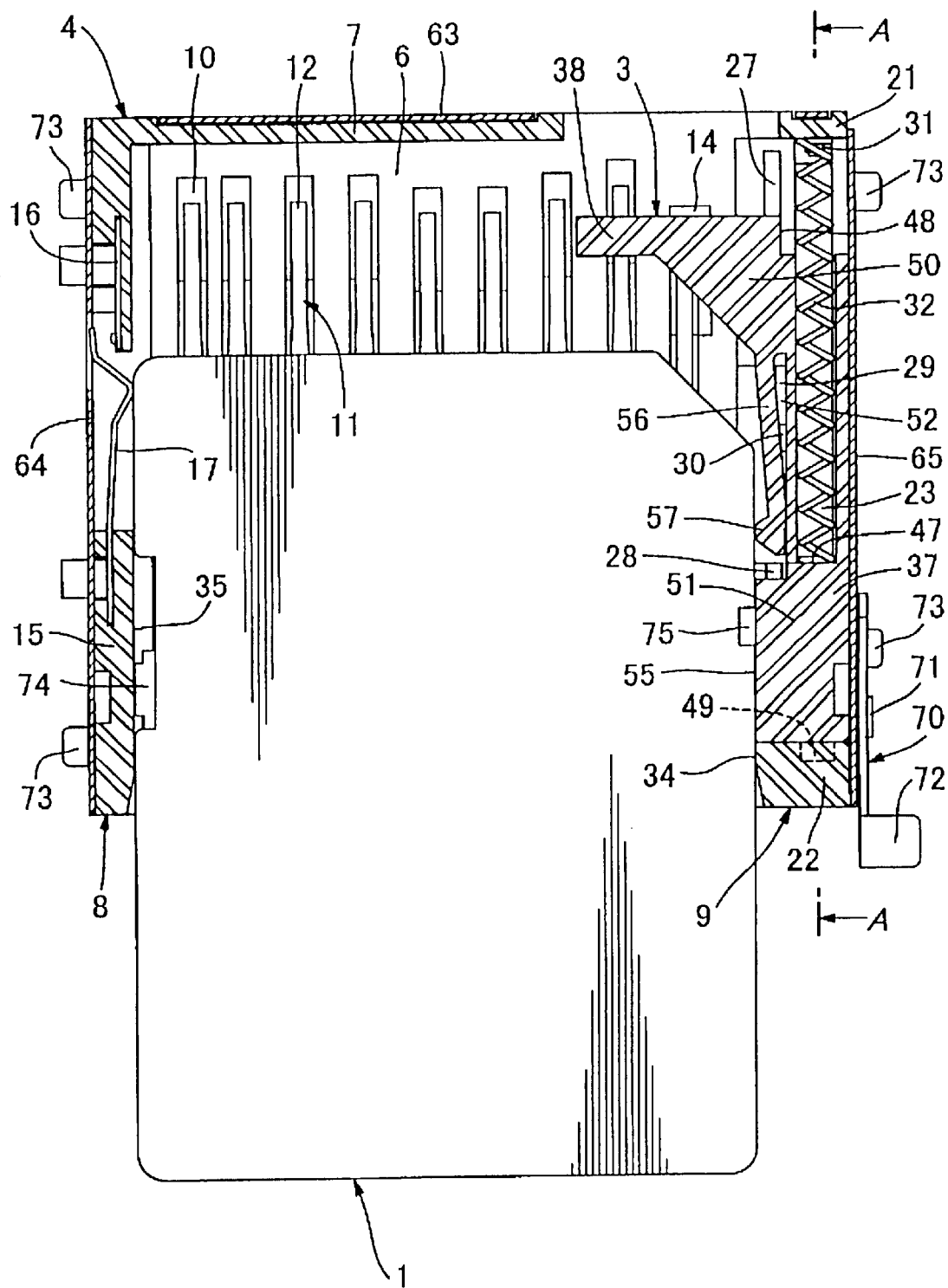
FIG. 5 is a plane sectional view of the card connector.
Figure 6:
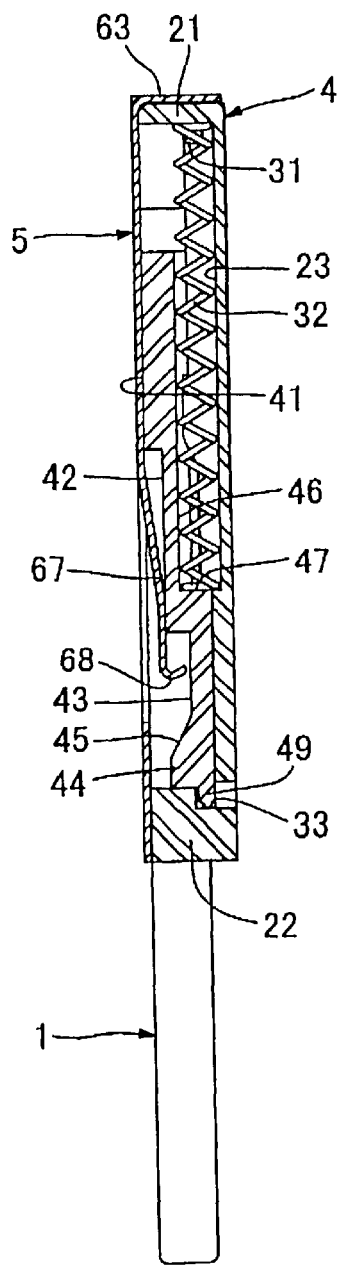
FIG. 6 is a sectional view taken along line A—A of FIG. 5.

In FIGS. 5 and 6, when the card 1 is inserted, the jaws 18 and 36 of the arm sections 8 and 9 fit in the shoulders 76 of the card 1, and the right-hand side of the card 1 makes contact with the inward projection 57 of the card retaining arm 56 and flexes the retaining arm 56 to the right. Since the inward projection 57 is rounded, the card retaining arm 56 is flexed smoothly.

Figure 8:
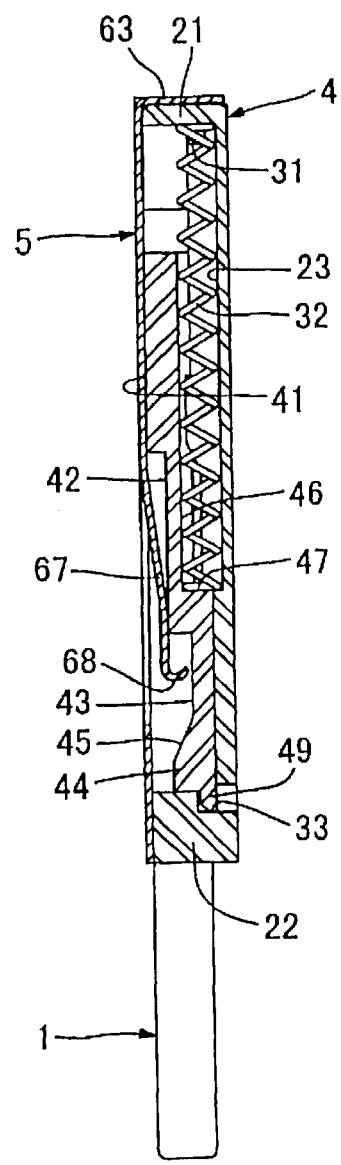
FIG. 8 is a sectional view taken along line A—A of FIG. 7.
Figure 7:
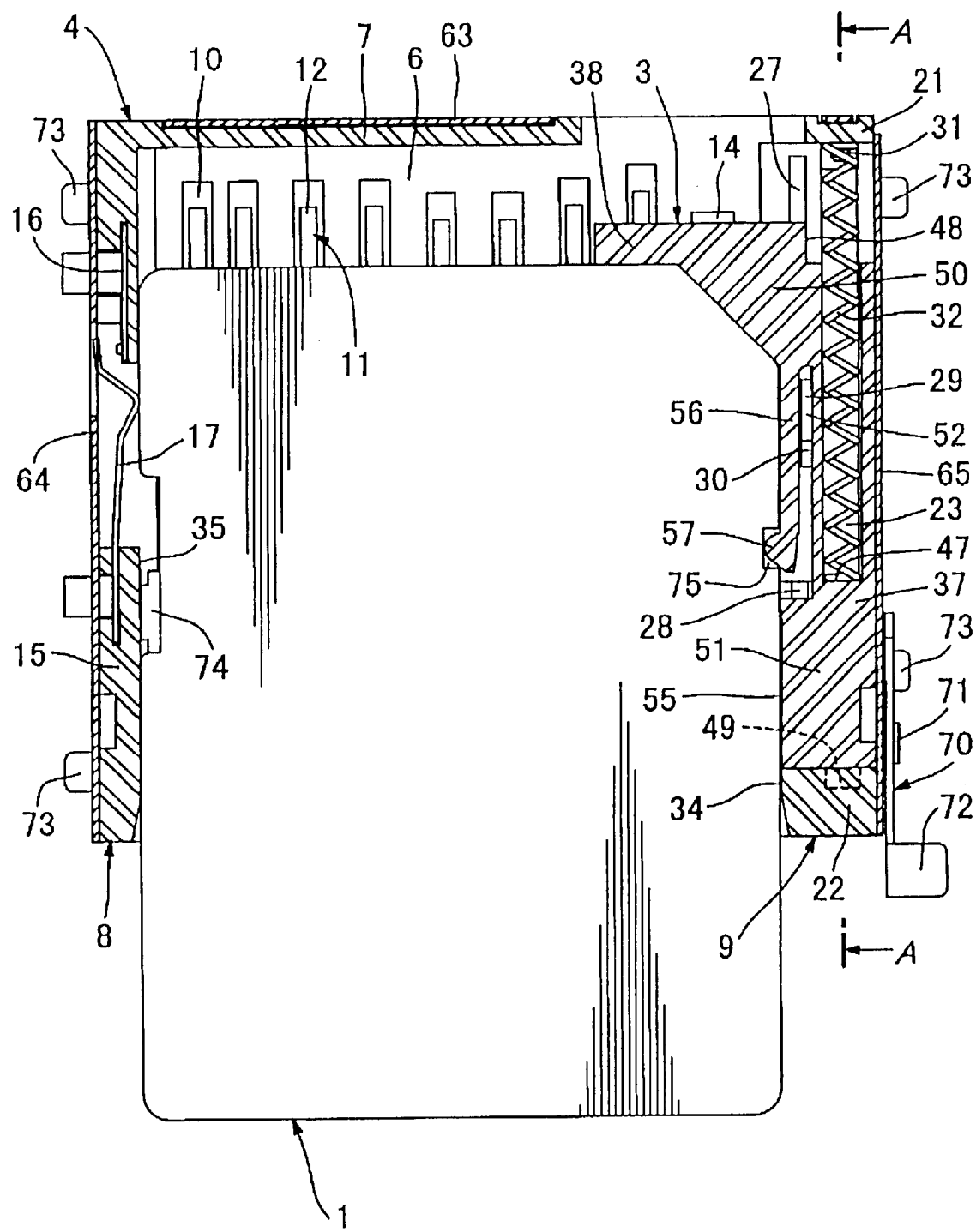
FIG. 7 is a plane sectional view of the card connector.

In FIGS. 7 and 8, when the card 1 is further inserted into the case 2, the front end of the card 1 abuts on the card abutment 38 of the slider 3. At this point, the inward projection 57 fits into the retention notch 75, returning the card retaining arm 56 to the original position.

Figure 9:
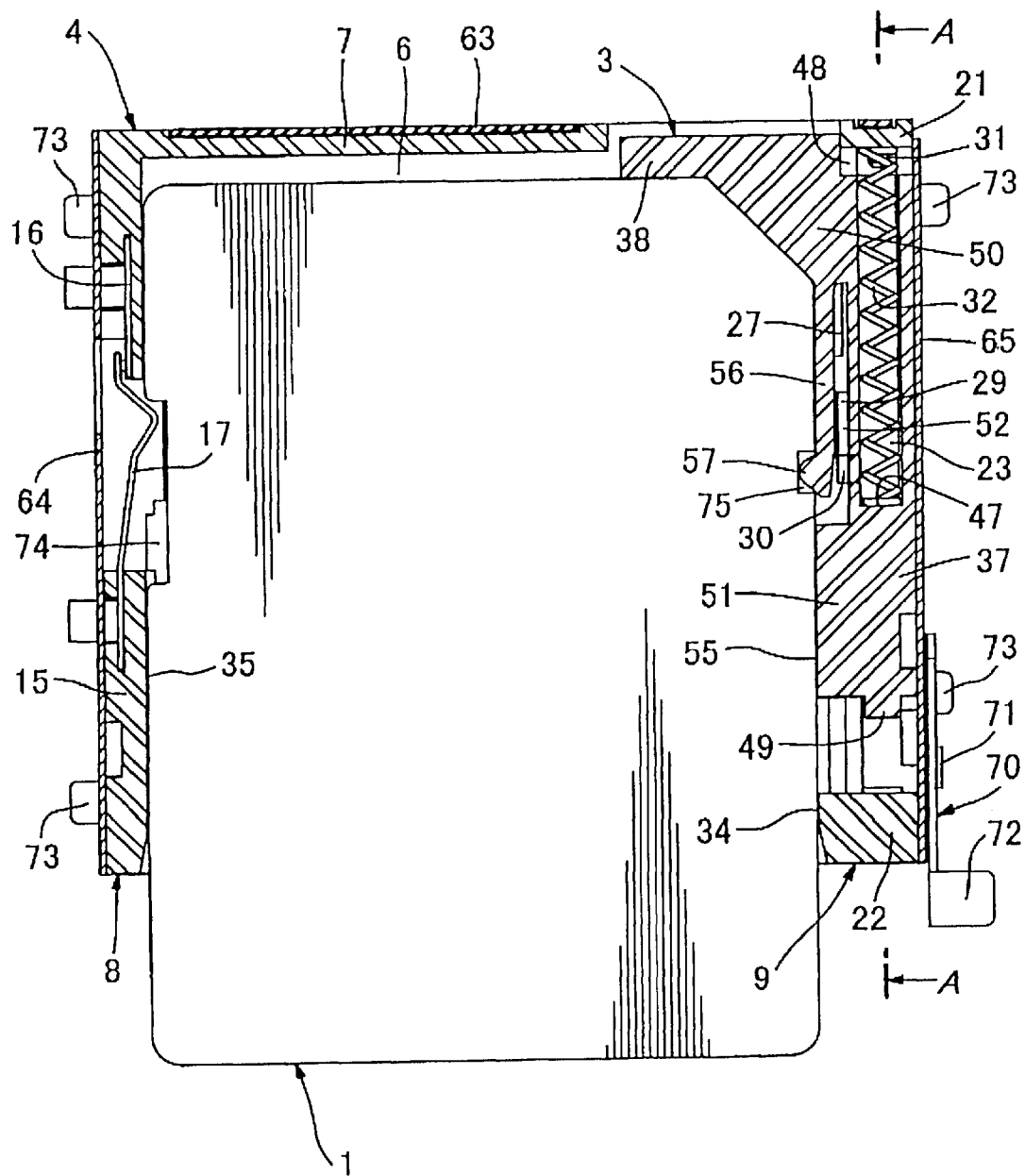
FIG. 9 is a plane sectional view of the card connector.

In FIGS. 9 and 10, when the card 1 is further inserted into the case 2 to push forwardly the slider 3, the engaging projection 49 disengages from the engaging hole 33 of the front stopper 22 while the support walls 60, 61, and 62 slides on the terminal receiving section 6 between the respective terminals 11 to prevent the card abutment 38 from bending downwardly. The raised portion 14 guides the support wall 62 to prevent the slider 3 from tilting by the push of the card 1. The spring 32 is compressed by the spring abutment 47, and the downward hook 68 of the stopper arm 67 slides on the inclined face 45 to the top of the raised portion 44, flexing upwardly the stopper arm 67. The card terminals 89 slide on the contact points of the connector terminals 11, flexing downwardly the connector terminals 11.

Figure 11:
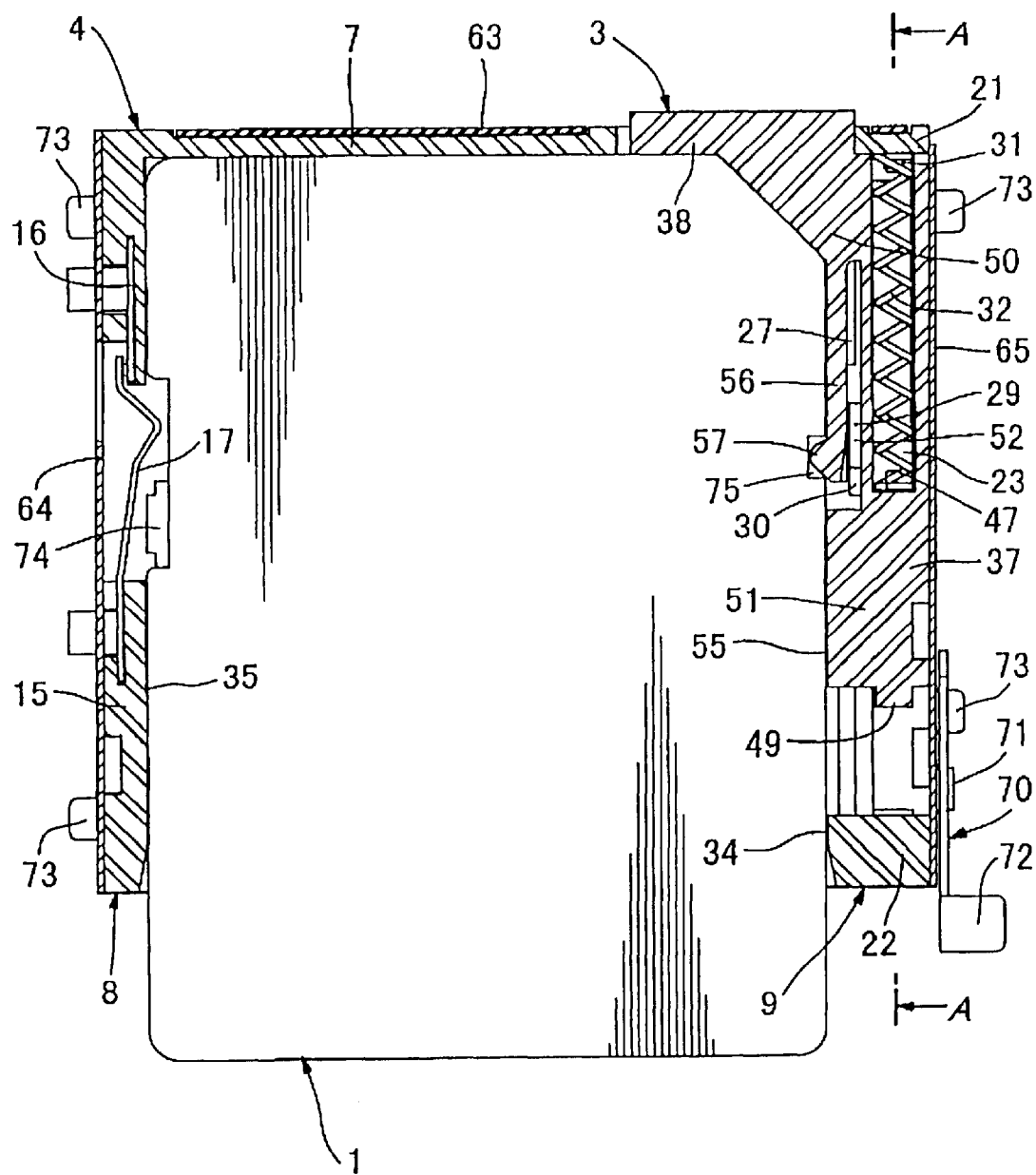
FIG. 11 is a plane sectional view of the card connector.

In FIGS. 11 and 12, when the card 1 is further inserted into the case 2, the spring 32 is further compressed, and the shoulder 48 of the slider 3 abuts on the rear slider stopper 21, restricting rear movement of the slider 3. At the same time, the stopper arm 67 flexes downwardly so that the downward hook 68 engages the front face of the raised portion 44, restricting forward movement of the slider 3. The outer face of the card retention arm 56 makes contact with the inner face of the raised portion 29 to prevent the card retention arm 56 from moving to the right so that the engagement between the inward projection 57 and the retention notch 75 is locked to prevent falling of the card 1. The card terminals are electrically connected to the contact points 12 of the connector to complete the insertion of the card 1 into the case 2. If the write protective switch 74 is at the rear position as shown in FIG. 19, the male and female terminals 16 and 17 make contact but, if it is at the front position, it breaks the contact between them, enabling to detect the condition of the write protective switch 74.

Figure 13:
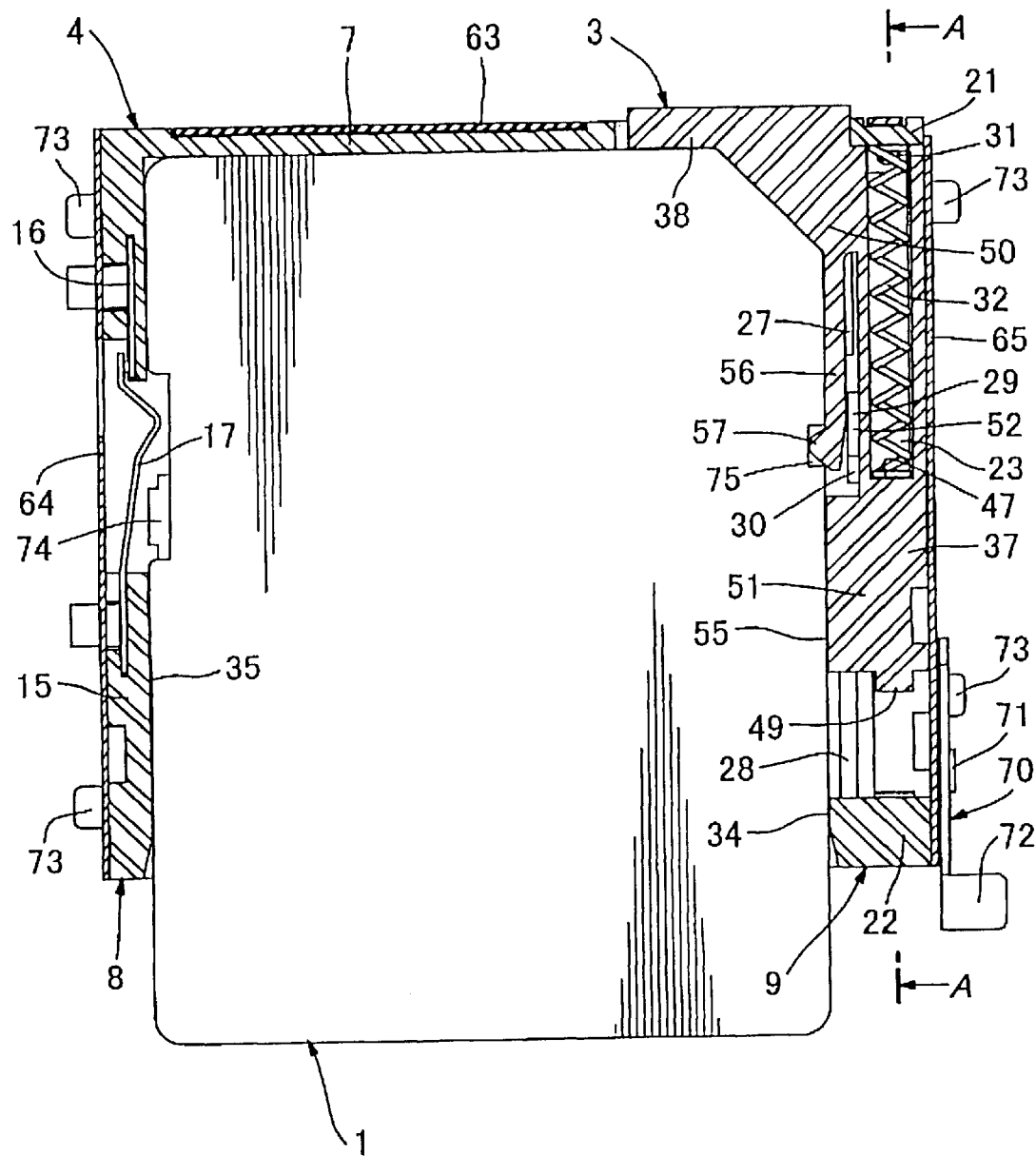
FIG. 13 is a plane sectional view of the card connector.
Figure 14:
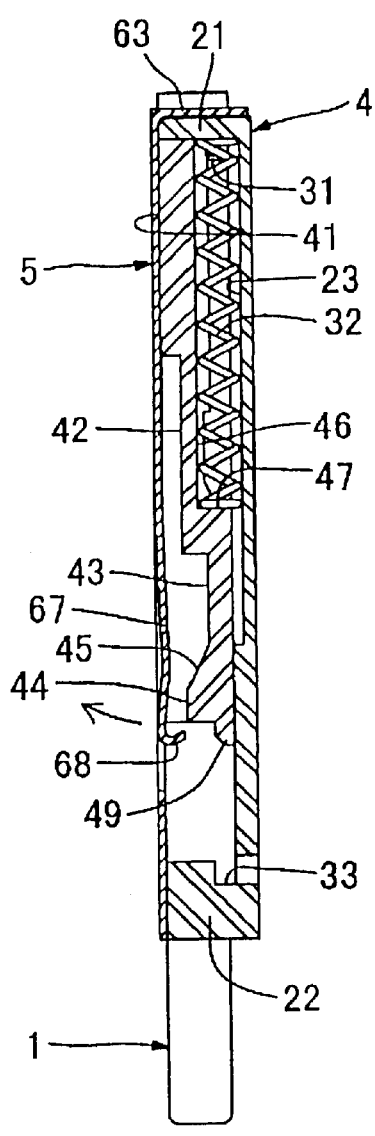
FIG. 14 is a sectional view taken along line A—A of FIG. 13.
Figure 15:
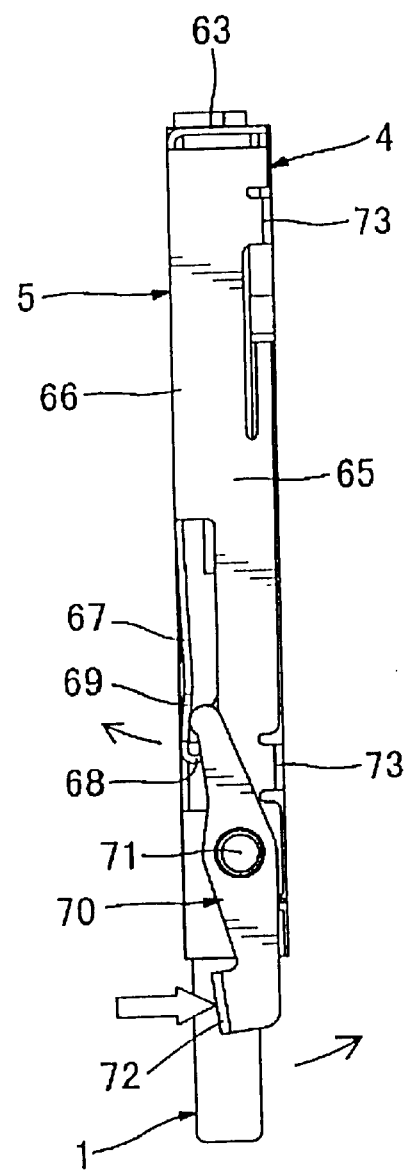
FIG. 15 is a side elevational view of the card connector.

In FIGS. 13–15, to remove the card 1 from the case 2, the operation tab 72 is depressed so that the lock release lever 70 is rotated counterclockwise about the support stud 71. Consequently, the front end of the lock release lever 70 engages the downward hook 68 of the stop arm 67 for lifting the stop arm 67. As a result, the downward hook 68 is released from the raised portion 44 so that the slider 3 is moved forwardly by the spring 32, bringing the card 1 to the forward position.

In FIGS. 7 and 8, the slider 3 abuts on the front abutment 22 so that when the card 1 is pulled rearwardly, the card retaining arm 56 is flexed to the right, releasing the inward projection 57 from the retention notch 75 for completion of the removal of the card 1. The inner side of the inward projection 57 is curved so that it is easy to remove the card 1.

Figure 16:
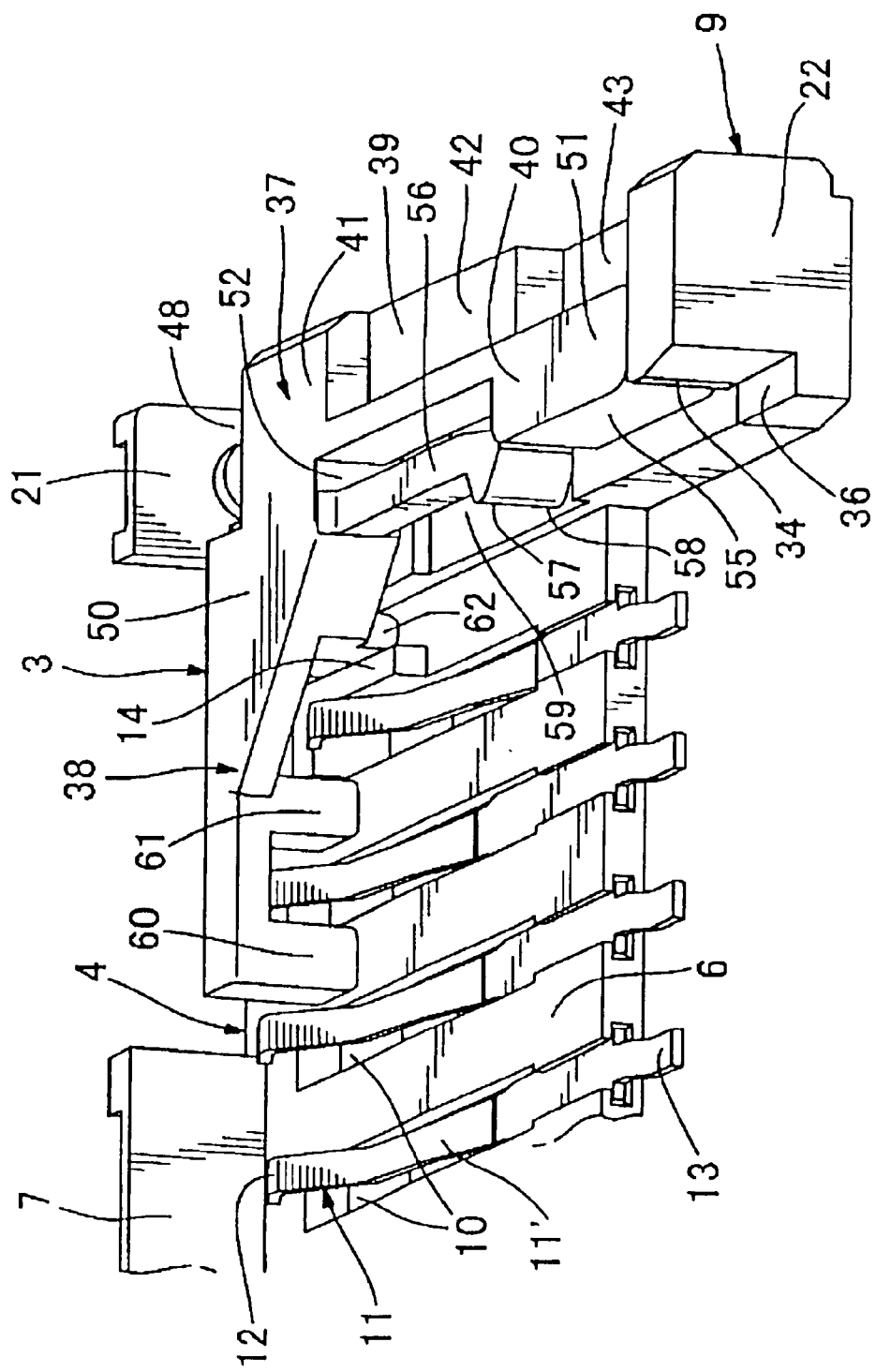
FIGS. 16–18 are perspective views of part of the card connector.
Figure 17:
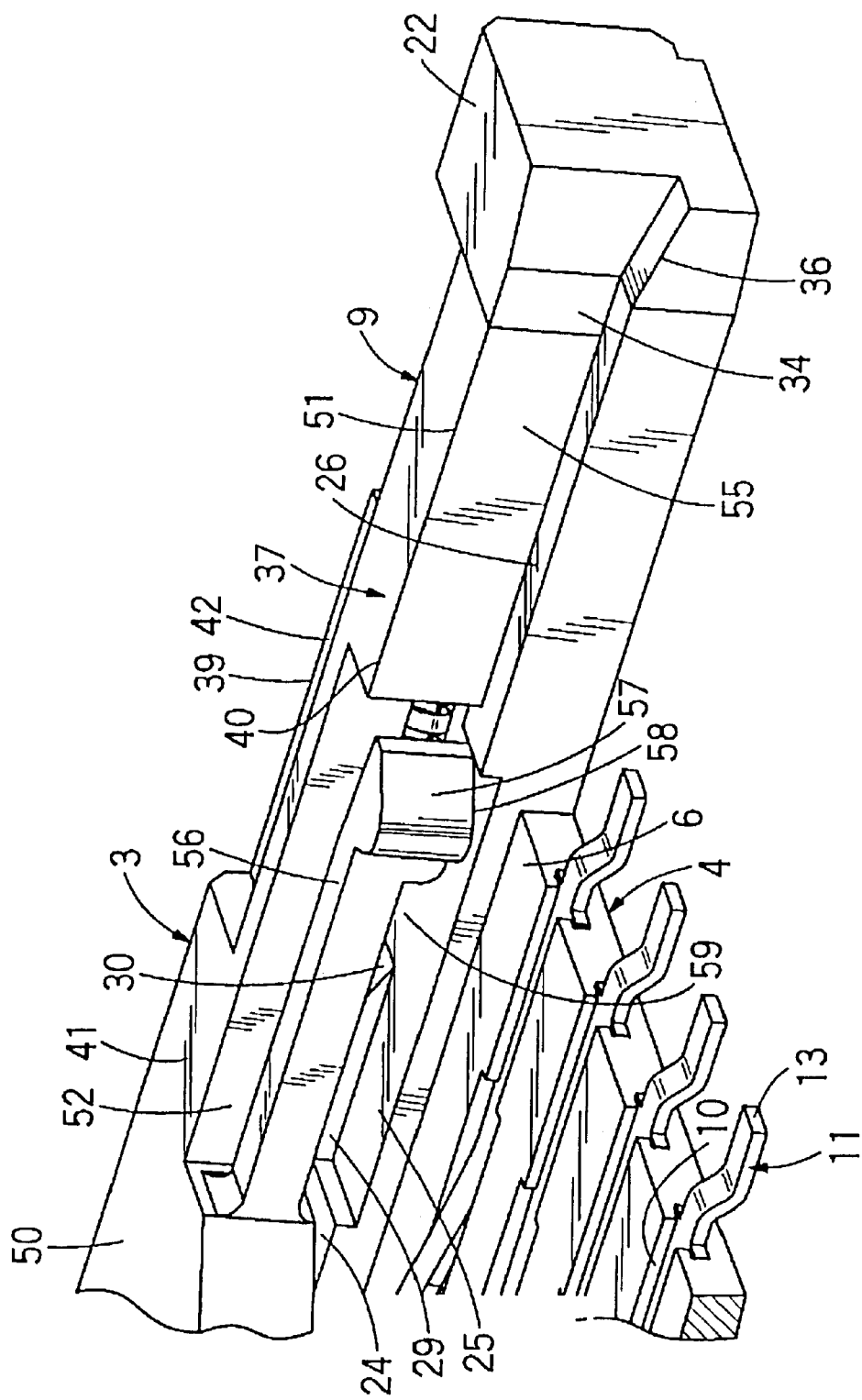
Figure 18:
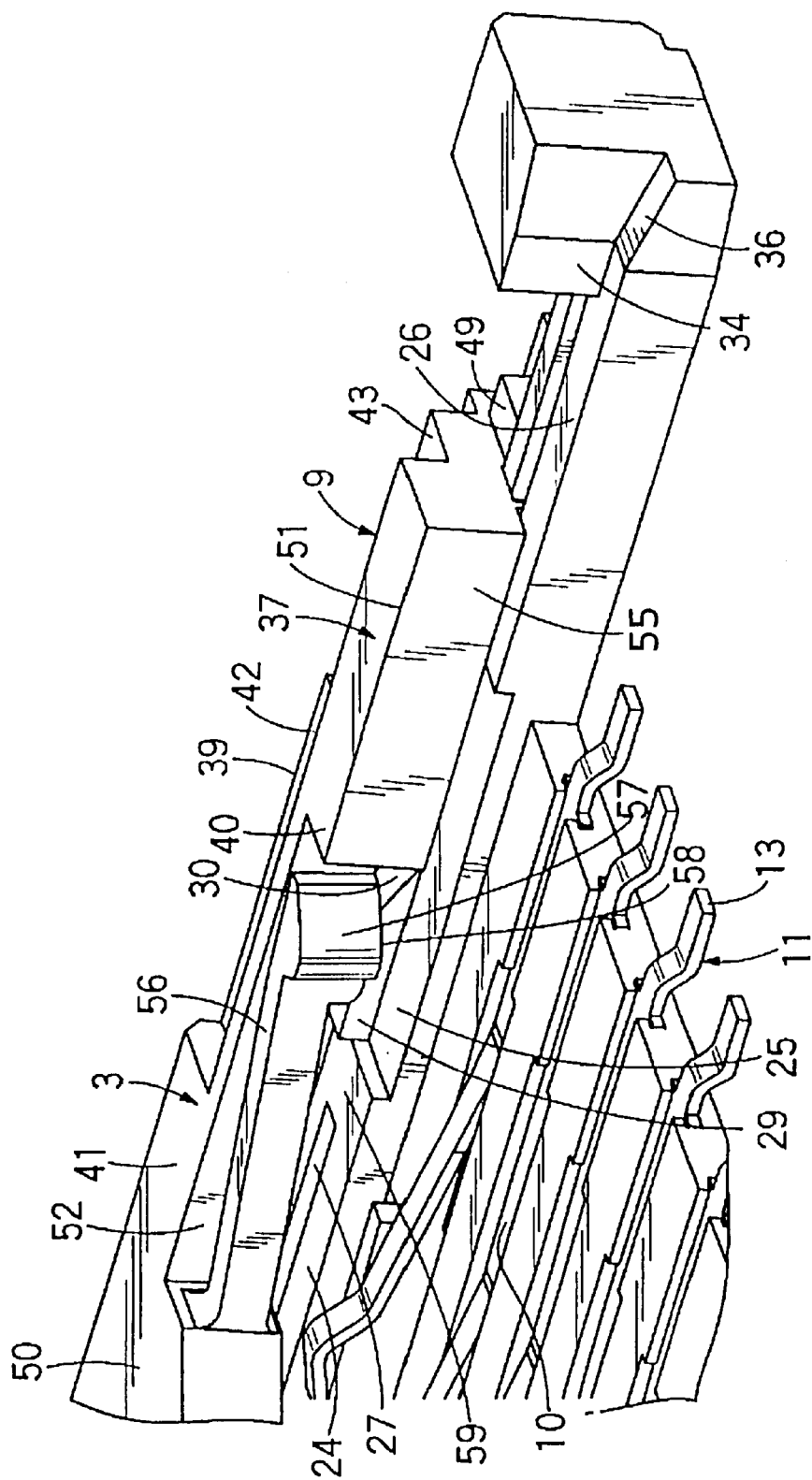

The insertion/removal of the card 1' from the card connector will be described with reference to FIGS. 16–18. The operation of the card 1' is the same as that of the card 1 except for the operation of the card retaining arm 56 and, therefore, the description will center on the operation of the card retaining arm 56.

When the card 1' is inserted into the case 2, the right-hand side wall of the card 1' abuts against the inward projection 57 of the card retaining arm 56, flexing the card retaining arm 56 to the right.

When the card 1' is further inserted into the case 2, the front end of the card 1' abuts on the card abutment 38 of the slider 3 to move the slider 3 rearwardly. The slider 3 is prevented to move rearwardly by the rear abutment 21 and forwardly by the stopper arm 67 so that the card 1' is locked in the case 2. As best shown in FIG. 18, the downward projection 58 of the card retaining arm 56 slides on the inclined face 30 to the top of the raised portion 29. Since there is the gap 59 under the card retaining arm 56, such sliding movement is made smooth. The flexure of the card retaining arm 56 to the right is not blocked by the raised portion 29 so that the card retaining arm 56 is not broken. The inward projection 57 of the card retaining arm 56 presses the card 1' to the left to prevent falling of the card 1'.

To remove the card 1' from the case 2, the lock release lever 70 is depressed so that the spring 32 moves the slider 3 and the card 1' forwardly up to the front abutment 22. The downward projection 58 of the card retaining arm 56 slides on the inclined face 30, and the card 1' is pulled rearwardly for removal.

Figure 22:
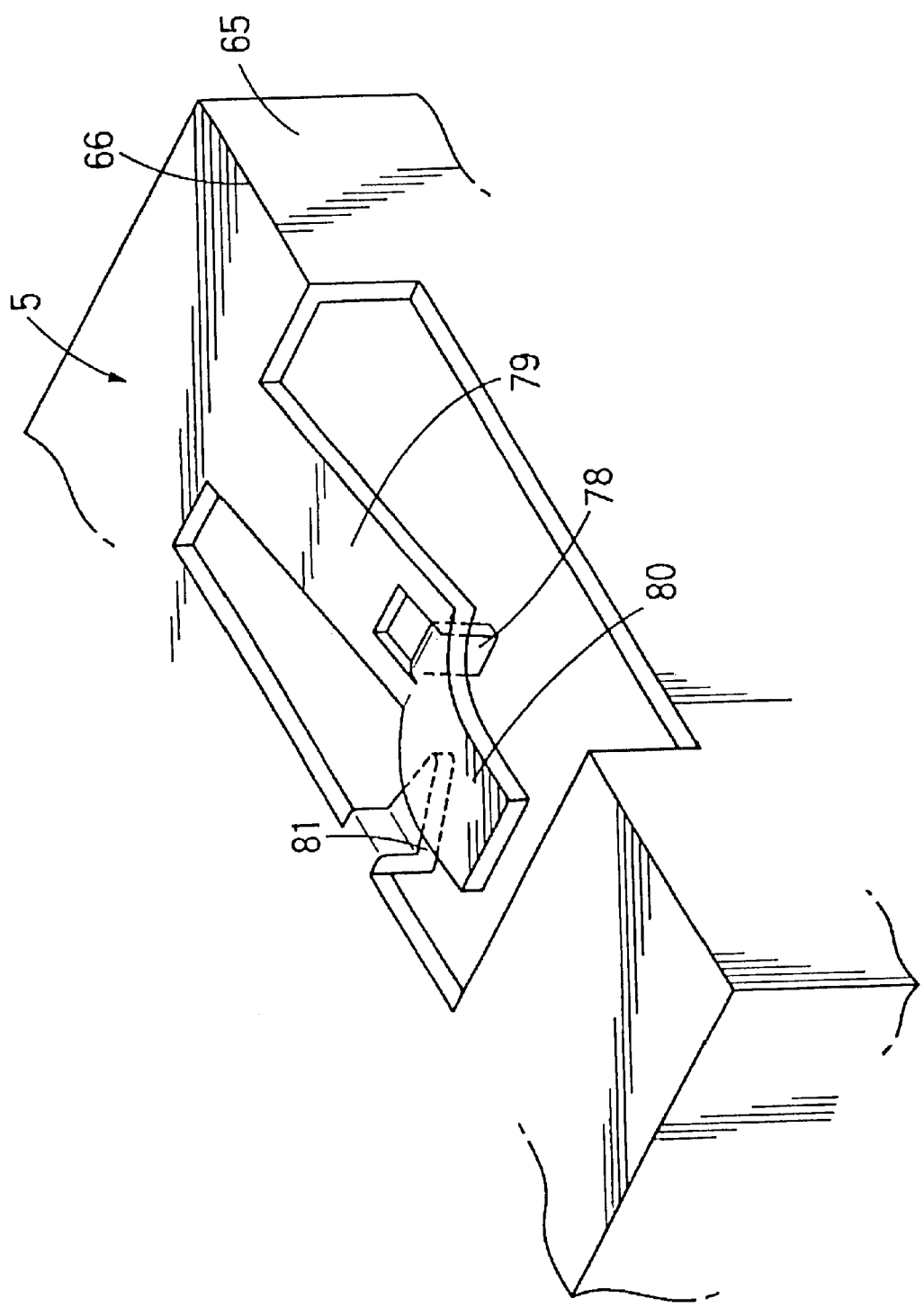
FIG. 22 is a perspective view of a lock release arm according to another embodiment of the invention.
Figure 23:
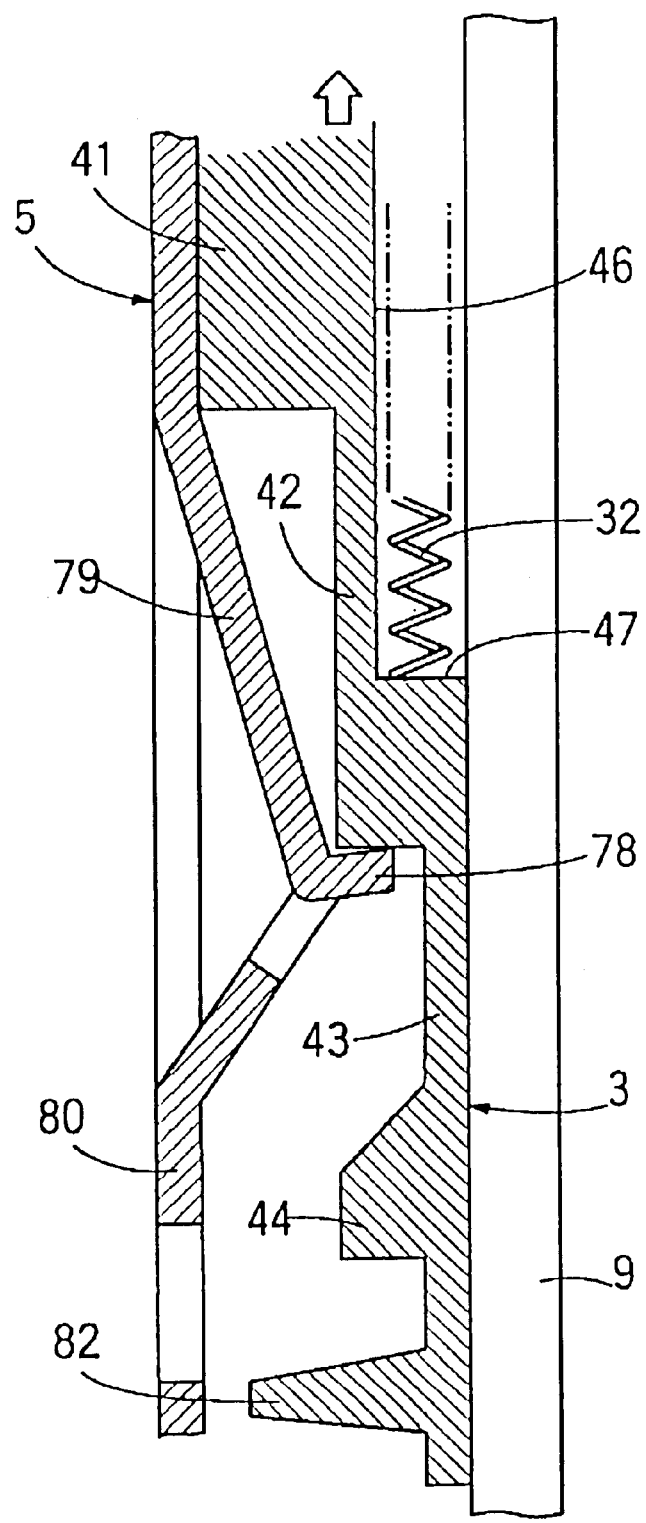
FIG. 23 is a sectional view of a lock release arm according to still another embodiment of the invention.

Alternatively, the card retaining arm 56 may be provided above or below the card. As shown in FIG. 22, the stopper arm 67 and the lock release lever 70 may be replaced by the stopper arm 79 having the downward hook 78 and a curved lock release lever 80 and a support piece 81 provided below the lock release lever 80. When the lock release lever 80 is depressed with the support piece 81 as a fulcrum, the downward hook 78 is lifted to release the lock. As shown in FIG. 23, the support piece 81 may be replaced by a support wall 82 provided in front of the raised portion 44 of the slider 3.

Figure 24:
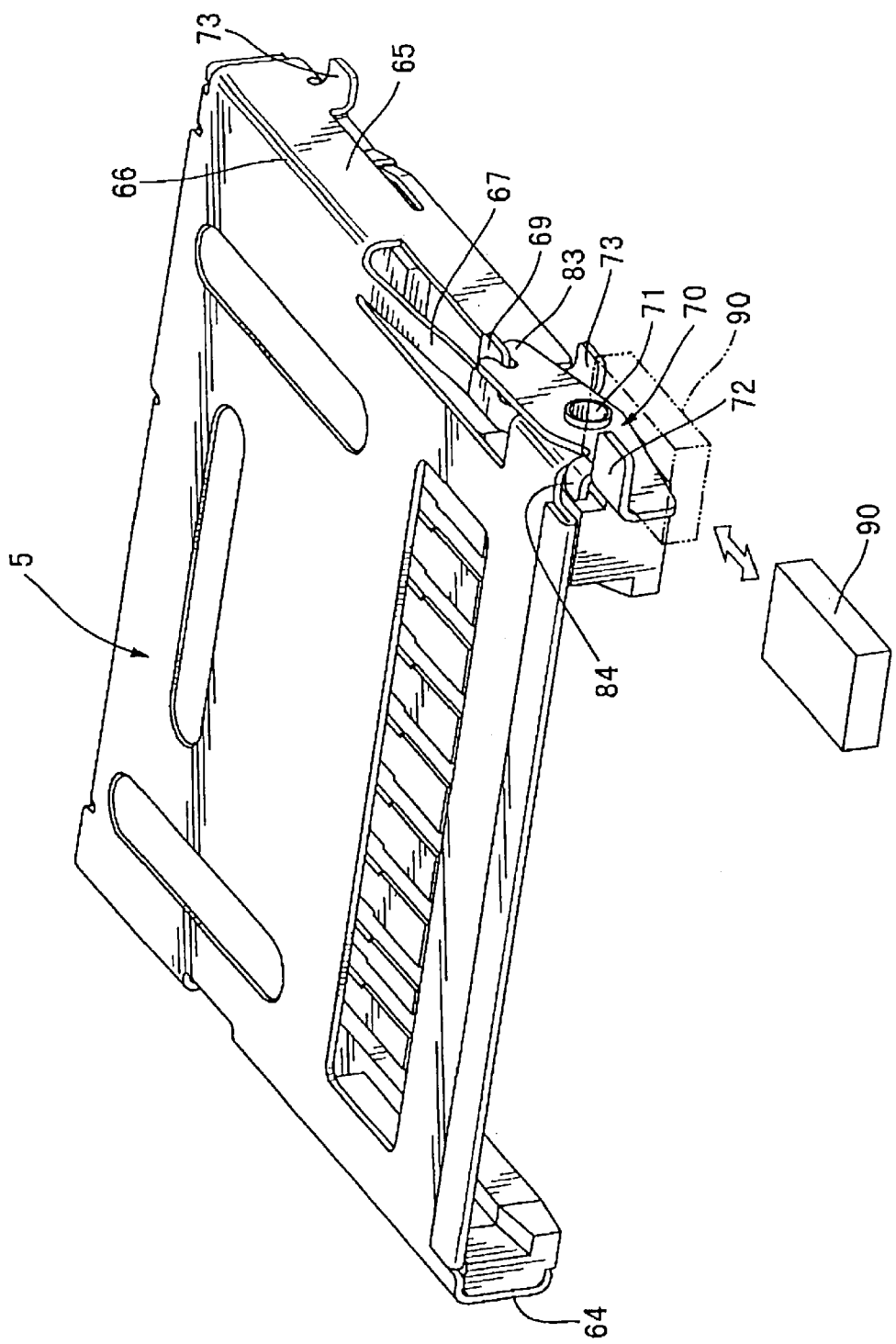
FIG. 24 is a perspective view of a lock release arm according to yet another embodiment of the invention.

In FIG. 24, the lock release lever 70 has a bifurcated rear end to hold the engaging piece 69 therebetween and a over-rotation preventive piece 94 at the front upper portion for engagement with the upper edge of the right-hand side wall 65. A rotation regulator 90 is moved into a space under the operation tab 72 of the lock release lever 70 by means of a switch that is provided on the mobile device to regulate the movement of the lock release lever 70 after the stopper arm 67 engages the slider 3. The over-rotation preventive piece 84 and the rotation regulator 90 regulate the rotation of the lock release lever 70, and the lock release lever 70 regulates the movement of the stopper arm 67 so that unintentional release of the stopper arm 67 from the slider 3, which is caused by impact or vibration applied to the stopper arm 67 when the mobile device is dropped, is prevented. Also, it is prevented that the lock release lever 70 rotates so much that the front end 83 is lifted too much to engage the stopper arm 67.

Figure 25:
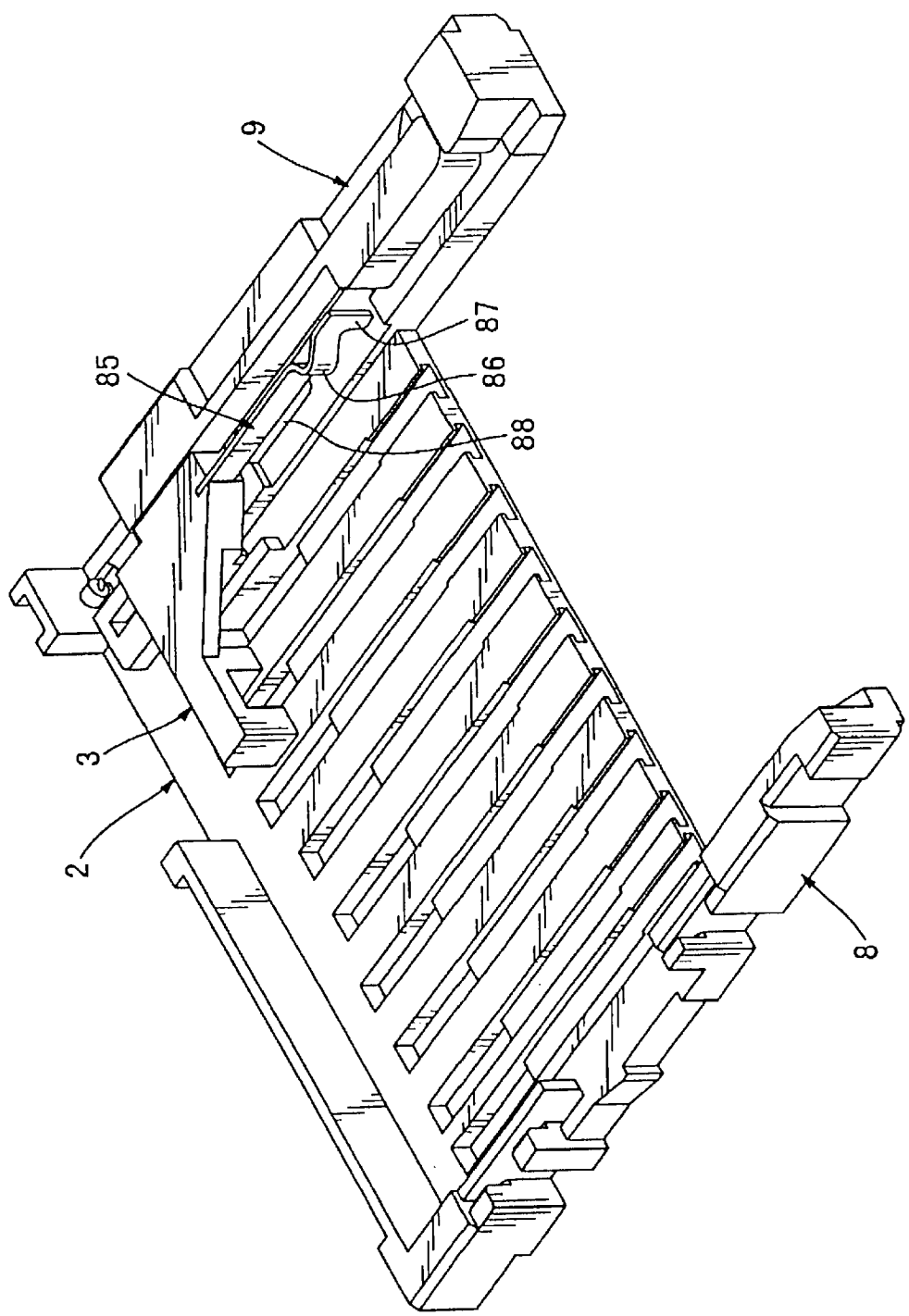
FIG. 25 is a perspective view of a card retaining arm according to another embodiment of the invention.
Figure 26:
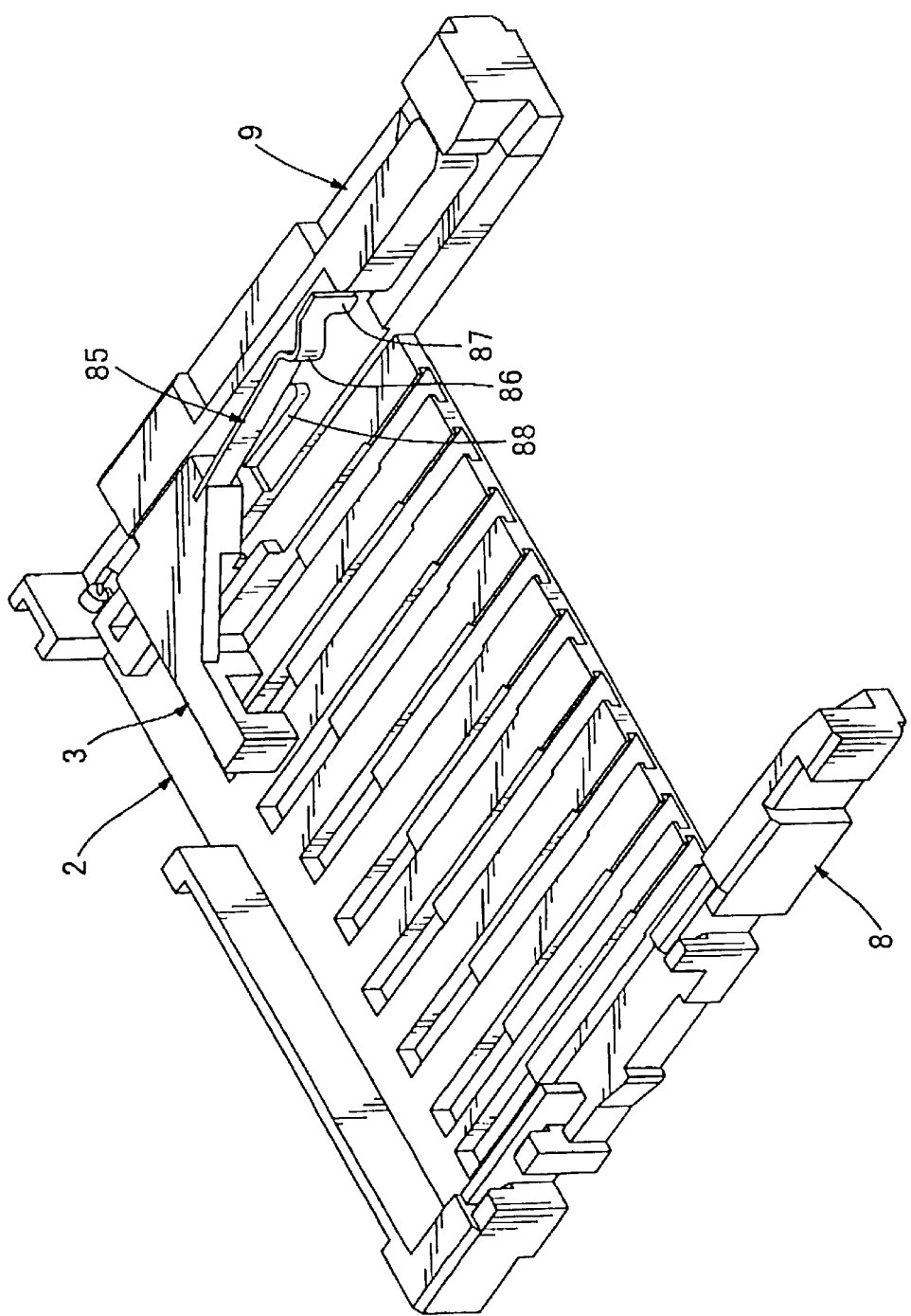
FIG. 26 is a perspective view of the card retaining arm of FIG. 25 that is flexed outwardly.
Figure 27:
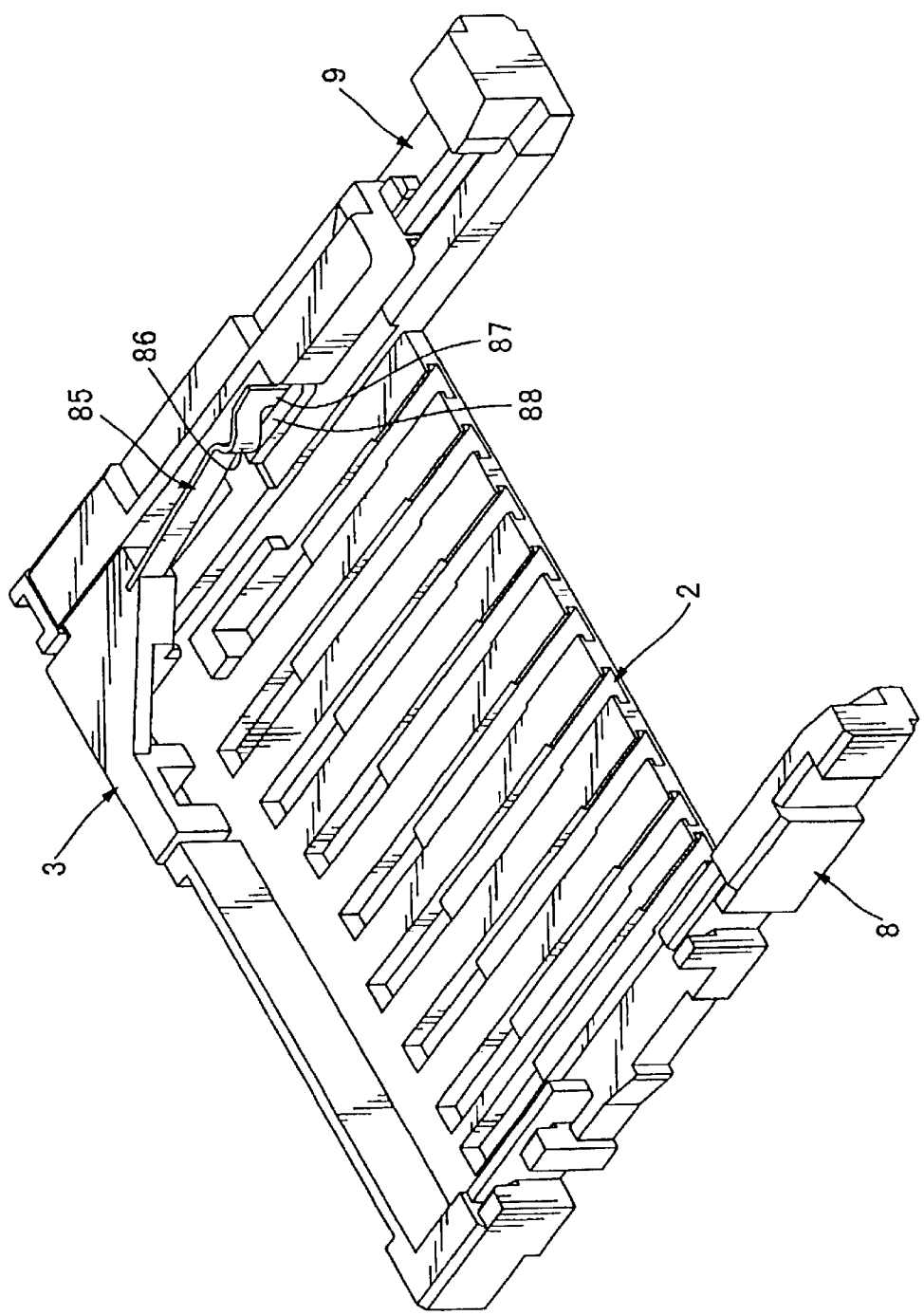
FIG. 27 is a perspective view of a raised member of the card connector according to another embodiment of the invention.

An operation tab may be provided on the upper or lower face of the mobile device to indirectly operate the operation tab 72, thereby not only facilitating the operation but also providing more design choices. In order to improve the resiliency and durability of the card retaining arm, the card retaining arm may be made separately from the slider 3 and of a metal or other resilient material than synthetic materials. For example, a card retaining arm of a metal piece is provided obliquely along the moving direction of the slider 3. In FIGS. 25–27, a card retaining arm 85 has an inward projection 86 and a front jaw 87, and a raised portion 88 has a flat form having a curved front face. When the card 1 with the retention notch 75 is inserted into the case 2, the inward projection 86 fits in the retention notch 75. When the card 1 is further inserted, the raised portion 88 blocks the card retaining arm 85 from moving outwardly, preventing falling of the card 1. As shown in FIGS. 26 and 27, when the card 1' with no retention notch is inserted into the case 2, the card retaining arm 85 is flexed outwardly and the front jaw 87 engages the outer side of the raised portion 88. Alternatively, the raised portion 88 may be provided on the case cover 5 and the front jaw 87 may be bent upwardly.

In order to restrict the outward movement of the card retaining arm, the raised portion 88 may be replaced by an elongated groove provided in the step-down portion 25. The card retaining arm has an inward projection and an downward abutment such that the lower end of the downward abutment abuts on the step-down portion 25 and is flexed upwardly so that it is able to slide on the step-down portion 25 as the slider 3 moves. When the card 1 is inserted to a predetermined position, the downward abutment 87 fits in the elongated groove to restrict outward movement of the card retaining arm 85. When the card 1' is inserted, the downward abutment 87 is flexed outwardly and slides on the step-down portion 25 and does not fit in the elongated groove. The card connector according to the invention is also useful for other cards such as an IC card that is mounted on a mobile device.

As has been described above, according to the invention, it is possible to reduce the number of components and simplify the mechanism to reduce the manufacturing cost and make the device compact. In addition, it is possible to make the lock release operation on the major face of the device, thus improving the operation. The same connector may be used for both types of cards with or without a retaining notch, reducing the manufacturing cost and preventing confusion in use.

What is claimed is:

1. A card connector for electrically connecting a removal card to a circuit board, comprising:

a case for accommodating said removal card;

a slider provided within said case for sliding in a card insertion/removal direction;

spring means for biasing said slider in a card removing direction;

a card retention arm cantilevered on said slider in said card insertion/removal direction and having an inward projection;

a raised portion provided on said case so as to abut on an outer face of said card retention arm so that when a removal card with a notch provided on a side thereof is inserted into said case, said inward projection engages said notch and when said removal card is further inserted, said raised portion restricts outward movement of said card retention arm.

2. The card connector according to claim 1, wherein said card retention arm comprises a downward projection;

said raised portion has an inclined face with a rising gradient in a card insertion direction so that when a removable card with no notch provided on a side thereof is inserted into said case, said downward projection slides on said inclined face to lift said card retention arm while said card retention arm is flexed outwardly.

3. The card connector according to claim 1, wherein said card retention arm has an engaging portion so that when a removable card with no notch on a side thereof is inserted into said case, said card retention arm is flexed outwardly and said engaging portion engages said raised portion.

4. The card connector according to claim 1, wherein said slider comprises:
   a card abutment for abutment with a front end of said removal card and
   a guide section for sliding on said case in said card insertion/removal direction.

5. The card connector according to claim 4, wherein said card abutment comprises at least one support wall, said case has at least one raised portion for guiding said support wall so that if said removable card is inserted in a wrong direction, said raised portion blocks said slider, thereby preventing completion of such insertion.

6. A card connector for electrically connecting a removable card to a circuit board, comprising:
   a case for accommodating said removable card;
   a slider provided within said case for sliding along with said removable card in a card insertion/removal direction;
   spring means for biasing said slider in a removing direction;
   a card retention arm cantilevered to said slider in said card insertion/removal direction and having an inward projection and a downward projection at a front end thereof;
   an elongated groove provided in said case in said card insertion/removal direction so that when a removable card with a notch provided on a side thereof is inserted into said case, said inward projection engages said notch and said downward projection slides on said case and then engages said elongated groove to prevent said card retention arm from reflecting outwardly whereas when a removable card with no notch is inserted into said case, said card retention arm is flexed outwardly and said downward projection slides on said case outside said elongated groove.

* * * * *